Nov. 29, 1960  A. F. DONOVAN ET AL  2,961,801
GLASS BENDING MOULD

Filed Dec. 7, 1956  9 Sheets-Sheet 1

ARTHUR F. DONOVAN,
HENRI T. JACQUOT +
RONALD E. RICHARDSON

BY: Cushman, Darby + Cushman
ATTORNEYS

ARTHUR F. DONOVAN,
HENRI T. JACQUOT and
RONALD E. RICHARDSON

Nov. 29, 1960     A. F. DONOVAN ET AL     2,961,801
GLASS BENDING MOULD

Filed Dec. 7, 1956

ARTHUR F. DONOVAN,
HENRI T. JACQUOT and
RONALD E. RICHARDSON

BY: Cushman, Darby & Cushman
ATTORNEYS

Nov. 29, 1960  A. F. DONOVAN ET AL  2,961,801
GLASS BENDING MOULD

Filed Dec. 7, 1956   9 Sheets-Sheet 4

ARTHUR F. DONOVAN,
HENRI T. JACQUOT and
RONALD E. RICHARDSON

BY: Cushman, Darby & Cushman
ATTORNEYS

Nov. 29, 1960 A. F. DONOVAN ET AL 2,961,801
GLASS BENDING MOULD
Filed Dec. 7, 1956 9 Sheets-Sheet 5

ARTHUR F. DONOVAN,
HENRI T. JACQUOT and
RONALD E. RICHARDSON

BY: Cushman, Darby & Cushman
ATTORNEYS

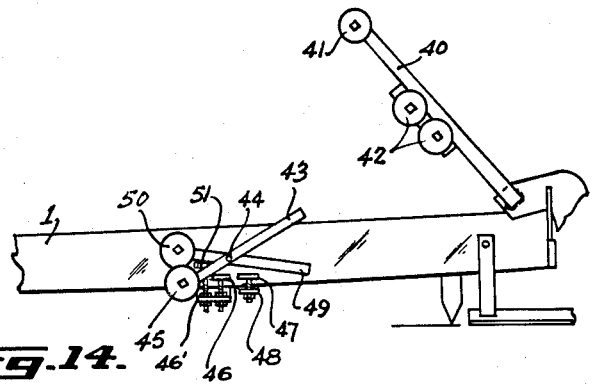
Fig.14.
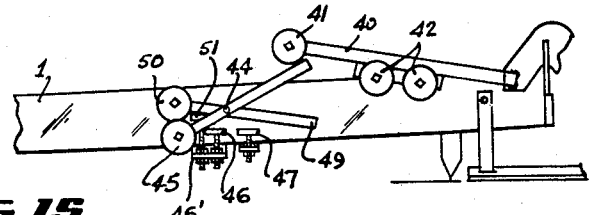
Fig.15.
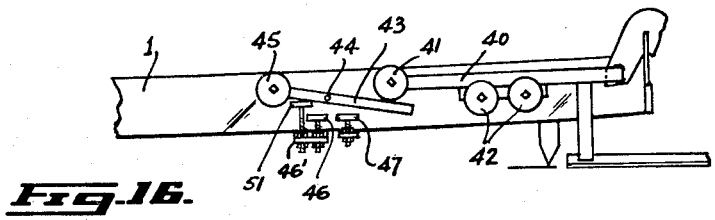
Fig.16.
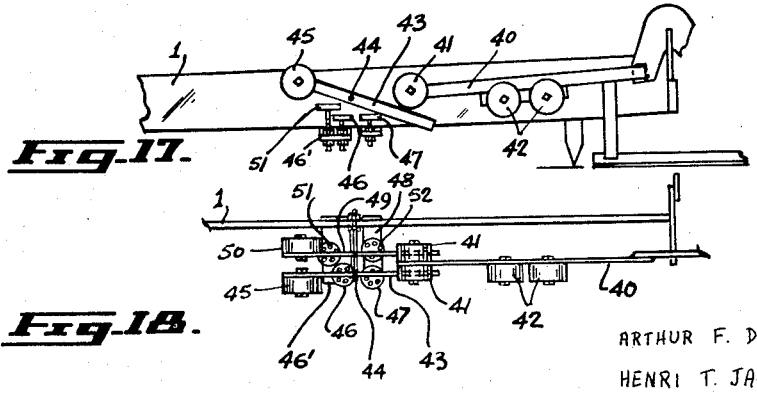
Fig.17.
Fig.18.
ARTHUR F. DONOVAN,
HENRI T. JACQUOT and
RONALD E. RICHARDSON
BY: Cushman, Darby & Cushman
ATTORNEYS Nov. 29, 1960 A. F. DONOVAN ET AL 2,961,801
GLASS BENDING MOULD
Filed Dec. 7, 1956 9 Sheets-Sheet 8
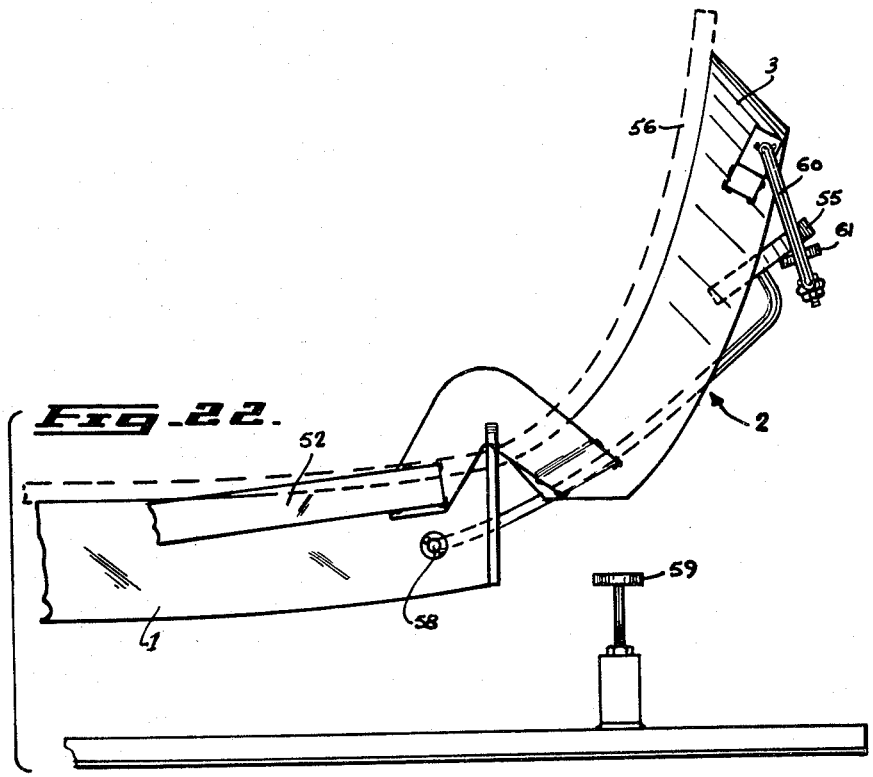
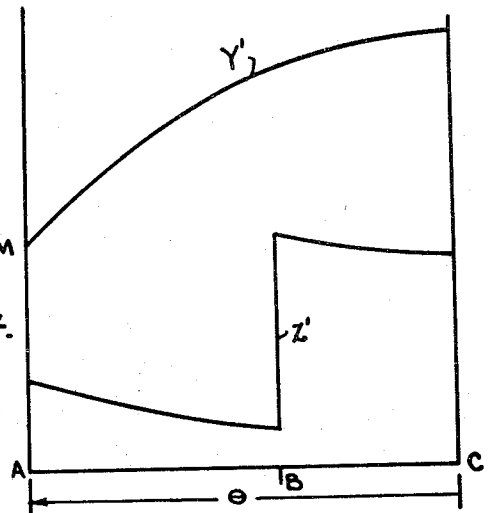
ARTHUR F. DONOVAN,
HENRI T. JACQUOT and
RONALD E. RICHARDSON
BY: Cushman, Darby & Cushman
ATTORNEYS United States Patent Office 2,961,801
Patented Nov. 29, 1960

2,961,801

GLASS BENDING MOULD

Arthur F. Donovan, Sandwich East, Ontario, Henri T. Jacquot, Windsor, Ontario, and Ronald E. Richardson, Oshawa, Ontario, Canada, assignors to Pittsburgh Plate Glass Company, Pittsburgh, Pa.

Filed Dec. 7, 1956, Ser. No. 626,946

Claims priority, application Canada Oct. 24, 1956

12 Claims. (Cl. 49—67)

This invention relates to improvements in glass bending methods and in the construction of moulds of the type that are employed in the bending of glass sheets to curved form. The advent in automobile design of wrap-around windshields and similar curved glass panels involving short radius bends has given rise to a need for efficient moulds for the initial processing of the glass sheets that will ultimately be assembled to form such panels.

The principal technique employed in forming curved glass is now well developed and consists of laying a glass sheet, or a pair of superposed glass sheets, flat on a concave multi-part skeleton mould which is constructed to tend to take up a curved configuration when so permitted by softening of the glass. The mould with the glass sheet or sheets laid thereon is passed through a lehr whereby the glass is raised to a temperature sufficient to render it yieldable to the forces exerted upon it by the mould. In this manner the required shape is imparted to the glass.

It has become the practice to form skeleton moulds for this purpose with pivoted end portions each of which either can be swung into a first position, when the flat cold glass is originally placed in position thereon (subsequently referred to as the "flat" orientation of the mould), or can move into a second position ("curved" orientation) as the resistance to bending of the glass decreases on exposure to high temperatures. Weighted arms are provided to act as counter-weights to compensate for the weight of the movable end portions of the mould and to urge such portions into the curved orientation.

There is a tendency, as the movable end portions of the mould turn upwards towards the curved orientation, for the weight of such end portions themselves to be less effective in resisting movement, due to the reduction in horizontal displacement of their centres of gravity from the pivotal axis. Often the reverse effect is experienced in respect of the counter-weight arms, since it is usual for these arms to achieve a generally horizontal disposition as the parts take up the curved orientation, when these arms will exert their maximum turning moment on the end mould portions. As a result of one or other or both of these factors, there is a tendency for the turning moment exerted on the glass to be steadily increased as the bending operation proceeds. This is not an entirely desirable condition in many instances. A certain minimum initial turning moment must be provided if the bending operation is to commence at the proper stage in the passage of the mould through the lehr, and the corresponding maximum bending moment that will occur towards or at the end of the bending cycle may be too large for optimum efficiency of operation. If this final bending moment is too large, the fact will be manifest in such faults as overbending of the tips of the glass, the formation of non-smooth bends due to too rapid bending, or undesirable stress patterns in the glass.

The object of the present invention is to provide a method of glass bending and a mould embodying a novel manner of counter-weighting the movable portions of the mould whereby to avoid the occurrence of undesirably high bending forces on the glass at certain times during the bending operation, more particularly the latter stages thereof.

In its broad aspect the invention may be defined as a method of bending glass on a glass bending mould of the type described, wherein initially a relatively large weight is used to bias the mould parts to the curved orientation, and subsequently, on attainment of a position part way towards said curved orientation, a relatively small weight is used to complete the operation.

The invention also consists of glass bending moulds for carrying such methods into practice.

The invention is illustrated by way of example in the accompanying drawings.

Figure 1 shows a plan view of the central area and one end of a concave skeleton mould embodying the present invention. The other end of this mould will be identical in mirror image with the illustrated end and thus has not been shown. The mould parts are shown in their "flat" orientation.

Figure 14 shows by means of a similar side view a fourth embodiment of the invention, the mould parts being in the "flat" orientation.

Figure 15 corresponds to Figure 14, but shows the mould parts in a first intermediate position between the "flat" and curved orientations.

Figure 16 is another view similar to Figure 15 but showing the mould parts in a second intermediate position between the "flat" and curved orientations.

Figure 17 is a view corresponding to Figures 14 to 16 with the mould parts seen in the fully curved orientation.

Figure 18 is a fragmentary plan view of the parts on one side of the mould in the position they occupy in Figure 17.

Figure 19:
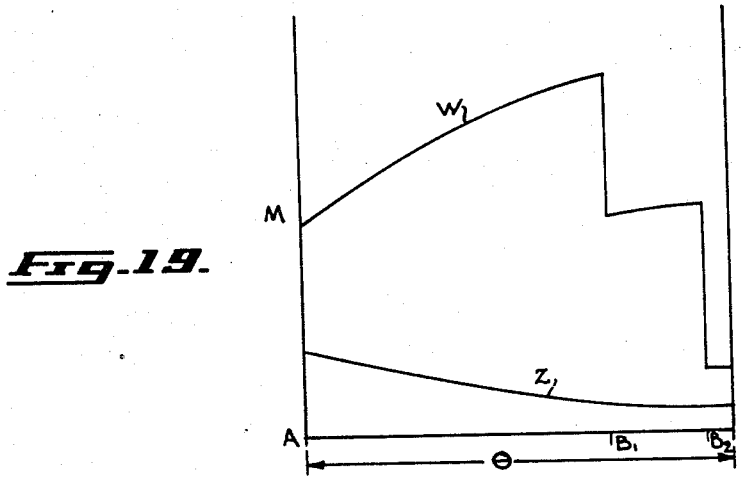

Figure 19 is a diagram illustrating the performance of the mould shown in Figures 14 to 18.

Figure 20:
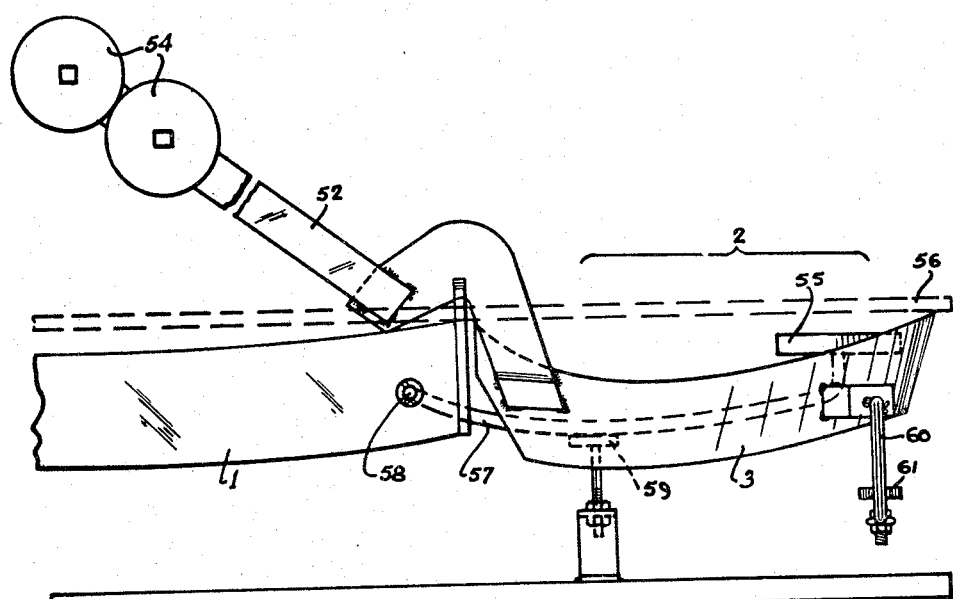

Figure 20 is a further side view of yet another embodiment of the invention showing the mould parts in the "flat" orientation.

Figure 21:
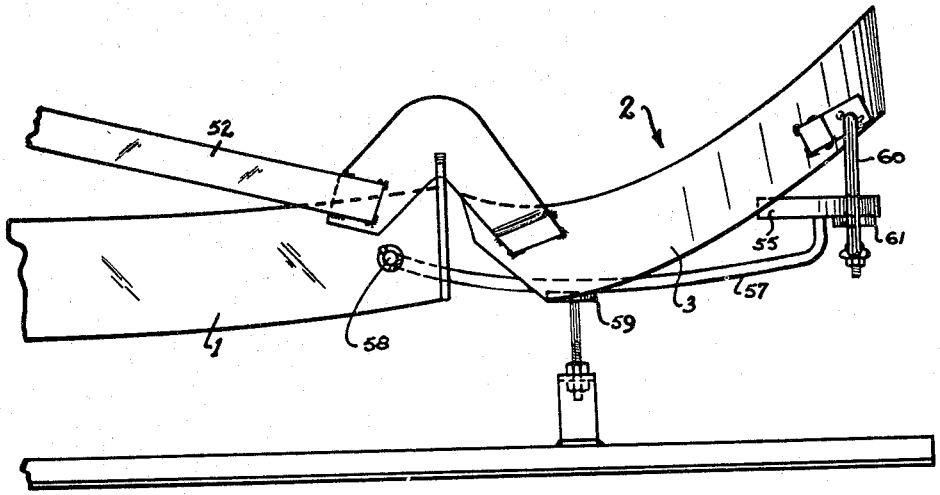

Figure 21 is a view similar to Figure 20 showing the mould parts part way towards the curved orientation.

Figure 22 is a still further similar view showing the mould parts in the fully curved orientation.

Figure 23:
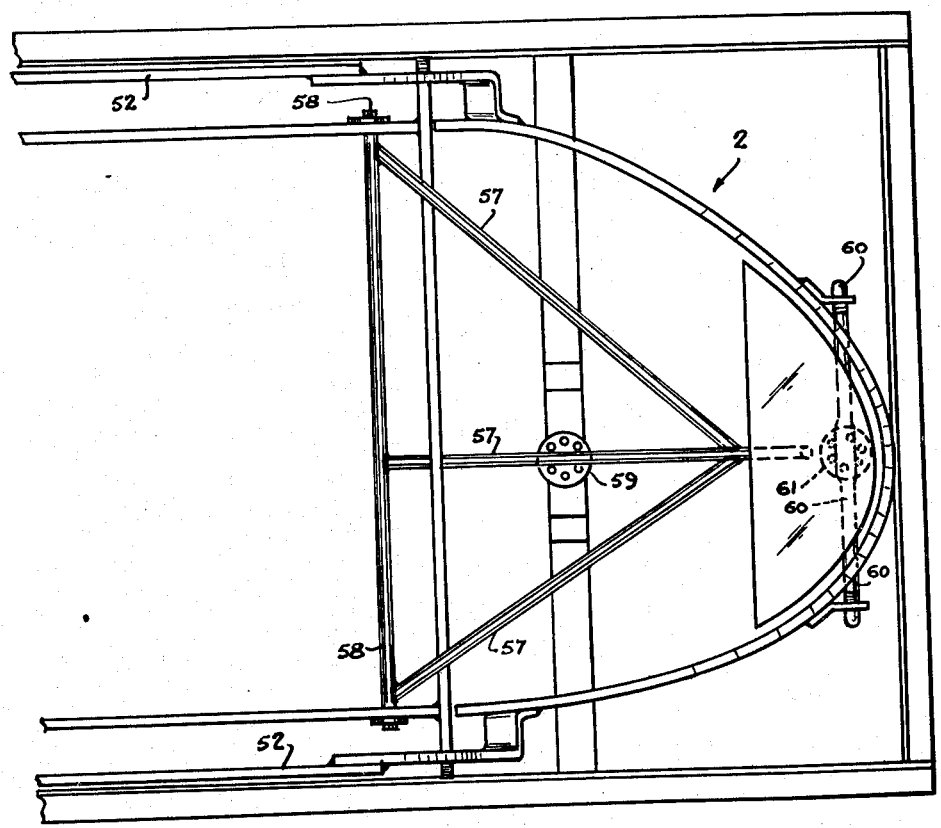

Figure 23 is a plan view of Figure 20.

Figure 24 is a diagram illustrating the performance of the mould of Figures 20 to 23.

The main side bars of the mould seen in Figures 1 to 5 are each designated by the reference numeral 1, the movable end portion at the end of the mould visible in the drawings being shown generally at 2. This movable end portion 2 consists of a bar 3 which, in the curved orientation of the mould (Figure 4), forms a contiguous smooth continuation of the main side bars 1. Each end of the bar 3 adjacent an end of a main side bar 1 is secured by suitable struts 4 to an arched bracket 5 to which there is further secured an arm 6 extending generally away from the end portion 2. The brackets 5 serve to mount the end portion 2 pivotally on a pair of vertical plates 7, each plate 7 being secured to an end of one of the main side bars 1. In the flat orientation of Figures 1 and 2 the two arms 6 extend almost vertically upwardly at an angle to the horizontal approximately equal to that through which it is desired to pivot the end portion 2 of the mould. A pair of weights 8 are secured to a plate 9 welded to each arm 6 intermediate its length, and a further weight 10 is mounted at the end of each arm 6. Each weight 10 is secured to its arm 6 by means of a bolt 11 which also serves as a pivot for an auxiliary arm 12 which forms an extension of the main arm 6. Each auxiliary arm 12 carries a further weight 13 at its free end and is free to turn under the influence of this weight into a substantially horizontal position, as appears from Figure 2. A stop 12' on the arm 12 engages the arm 6 to prevent further downward rotation of the arm 12. Conventional bracing members 19 maintain rigidity.

Figure 1:
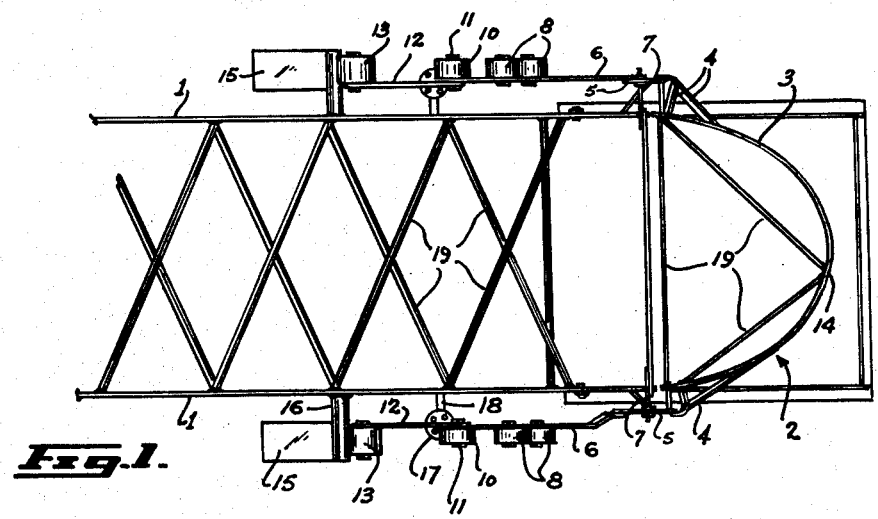
Figure 5:
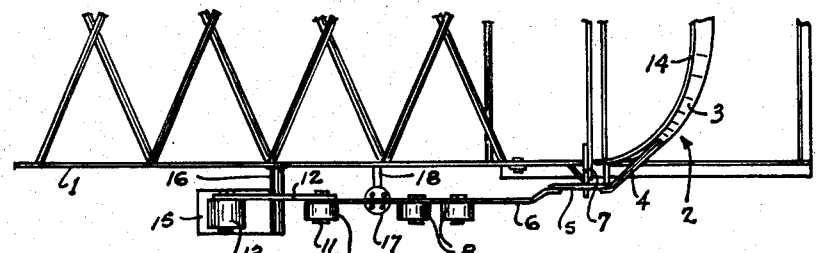
Figure 5 is a further fragmentary plan view similar to Figure 1 but showing the mould parts in the curved orientation seen in Figure 4.

As best seen in the plan views of Figures 1 and 5, the arms 6 and 12 carrying the weights 8, 10 and 13 are disposed outwardly of the side bars 1 in order to be free to move downwardly without encountering the glass sheet (not shown in the drawings) which will overlap the edges of the bars 1 by a small amount, generally about half an inch. The weight and rigidity of the glass will initially prevent upward movement of each end portion 2 of the mould, although the tip 14 of the bar 3 of such end portion will press upwardly against the underside of the glass near its extreme end with a force determined by the turning moment produced by the combined effects of the weights 8, 10 and 13 less that resulting from the weight of the end portion 2 itself. The parts will remain in the position seen in Figures 1 and 2 until the glass begins to soften as a result of the increasing temperature that it encounters through the lehr. Gradually the turning moment exerted by the weights, which will more than counter-balance the weight of the end portion itself, will take charge and the glass will allow the end portion at each end of the mould to swing slowly upwards.

Figure 3:
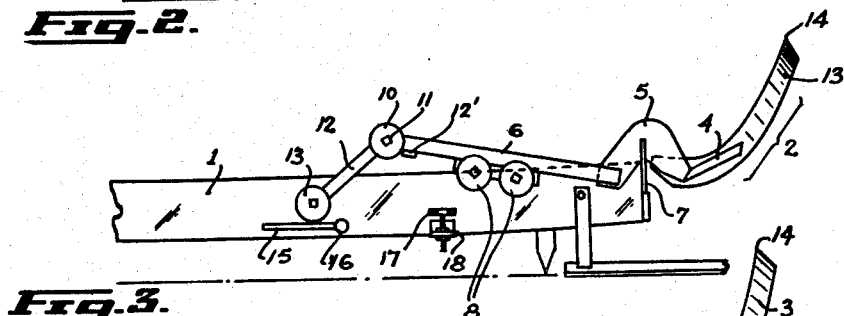
Figure 3 is a further side view corresponding to Figure 2 but showing the mould parts part way between the "flat" and curved orientations.
Figure 4:
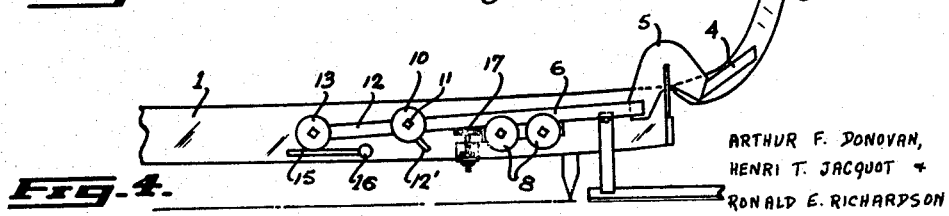
Figure 4 is a second side view similar to Figure 2 but showing the mould parts in the fully curved orientation.

The first part of each arm assembly to come into contact with a fixed part of the mould will be the weight 13. Each of these weights 13 will come to bear on a supporting shelf 15 secured to the fixed parts of the mould by means of a rod 16 extending outwardly from each side bar 1. The position as the weights 13 just contact the shelves 15 is seen in Figure 3. As the glass continues to yield to the bending forces and the movable end members continue to rotate, the main arms 6 will move further downwardly until each comes to rest on one of a pair of adjustable stops 17 secured by means of brackets 18 to the outside of each side bar 1. During this latter downward movement the weights 13 will roll along their respective shelves 15, their weight, or at least a substantial portion of it, being supported by such shelves. When the downward movement has finally been completely arrested by the stops 17, the parts will occupy the fully curved orientation seen in Figures 4 and 5.

Figure 2:
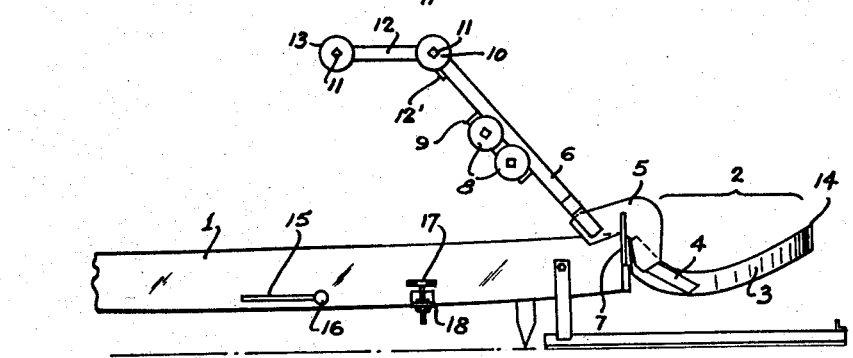
Figure 2 is a side view of the mould seen in Figure 1.
Figure 6:
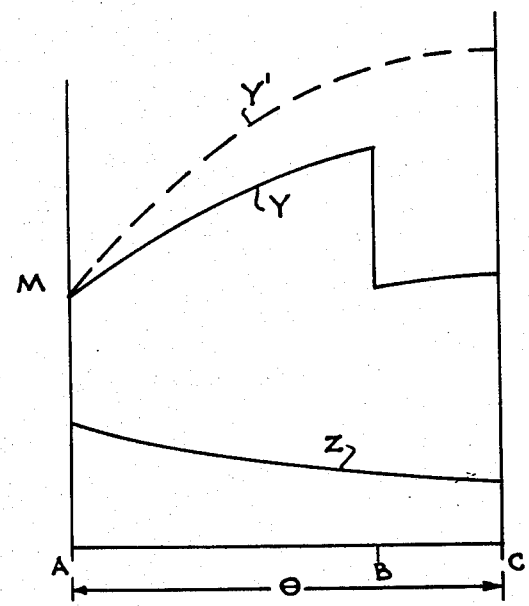
Figure 6 is a diagram illustrating the performance of the mould shown in the preceding figures.
Figure 7:
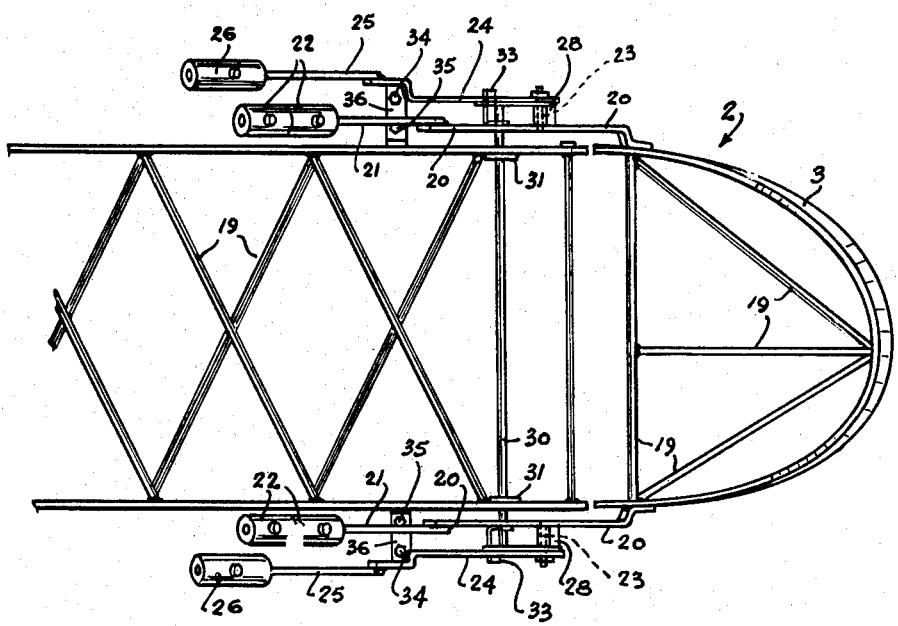
Figure 7 is a plan view similar to Figure 1, but showing a second embodiment of the invention with the mould parts in the "flat" orientation.

It will be apparent that the turning moment exerted on each end member 2 will gradually increase from the initial position seen in Figure 2 as the effective lever arm increases upon movement of the weights 8 and 10 a greater horizontal distance from the plates 7. Then, towards the end of this movement, there will be a sudden reduction in the turning moment consequent upon the support of the weights 13 by the shelves 15. The effective turning moment M exerted on the end portion 2 by the counter-weight arms is shown in Figure 6 as curve Y plotted against angular displacement θ of the end portion. Point A is the fully "flat" orientation; point B represents the point at which the weights 13 touch the shelves 15; and point C represents the fully curved orientation. Curve Z shows the counter turning moment produced by the weight of the end portion itself, and the total turning moment will be the difference between the two curves Y and Z. It will be noted that these two curves have a tendency to diverge as the curved orientation of the mould is approached, which would give rise to a continuous increase in the effective force exerted on the glass by the mould as the bending operation proceeds. This characteristic which, as has been explained, is not always desirable, is at least partially offset by the step in the curve Y at the point B when the shelves 15 begin to support the weight of the weights 13.

The structure of the device produces an effective flattening of the curve Y in another respect which also acts to diminish the tendency for the curves to diverge. By reason of the horizontal disposition of the auxiliary arms 12 in the "flat" orientation (Figure 2), the left hand end of the curve Y is rather flatter than it would be if the arms 12 were in the form of continuous but otherwise similar extensions of the upwardly extending main arms 6. Thus for a given initial effective turning moment (the difference between curves Y and Z at point A) which will in practice be required not to fall short of a minimum value for satisfactory initiation of the bending process, the maximum and final turning moments are maintained at values not excessive for suitably bringing the bending operation to a prompt but unhurried conclusion with substantially no risk of overbending or marking of the glass. A curve Y' shown in broken lines in Figure 6 represents the turning moment produced by a typical straight, rigid arm weighted to produce an initial turning moment equal to that produced by the present device. The greater divergence of this curve Y' from the curve Z, in comparison with the curve Y is immediately apparent.

A second embodiment of the invention is illustrated in Figures 7 to 10. The mould here shown is basically similar to that already described, consisting principally of side bars 1 and a movable end portion 2 comprised of a bar 3. In this instance the movable end portion 2 is pivotally mounted by means of a pair of arms 20, one end of each of such arms 20 being connected to one end of the bar 3, while the other end of such arm 20 has connected to it a rod 21 carrying a pair of weights 22. Intermediate its length, each of the arms 20 carries a pin 23 on which is pivotally mounted an auxiliary arm 24 having secured to its free end a rod 25 bearing a weight 26. The arms 24 with the rods 25 and weights 26 that they carry extend generally parallel with the arms 20, rods 21 and weights 22 outwardly thereof. The auxiliary arms 24 are thus pivotally mounted by the pins 23 on the arms 20. The whole assembly of the four arms and with them the end mould portion 2 is mounted to turn about pins 27. Each arm 20 is mounted on one of these pins by means of a plate 28 which is secured to the arm 20 and extends downwardly to engage over the pin 27. The pins 27 are fixed in relation to the main mould parts by means of upstanding brackets 29 on each side of the mould. These brackets 29 are held in position by means of a transversely extending rod 30 which in turn is secured to the side bars 1 by means of brackets 31.

Relative rotation between each main arm 20 and its auxiliary arm 24 is limited by an adjustable stop 32 mounted on a bracket 33 depending from the arm 20 and extending into a position beneath the arc of travel of the auxiliary arm 24. In addition, further adjustable stops 34 and 35 are provided secured to a bracket 36 projecting outwardly from each of the side bars 1. Each of the brackets 36 is arranged to position its stops 34 and 35 respectively in the path of travel of an auxiliary arm 24 and a main arm 20, as best appreciated from Figure 7.

Figure 10:
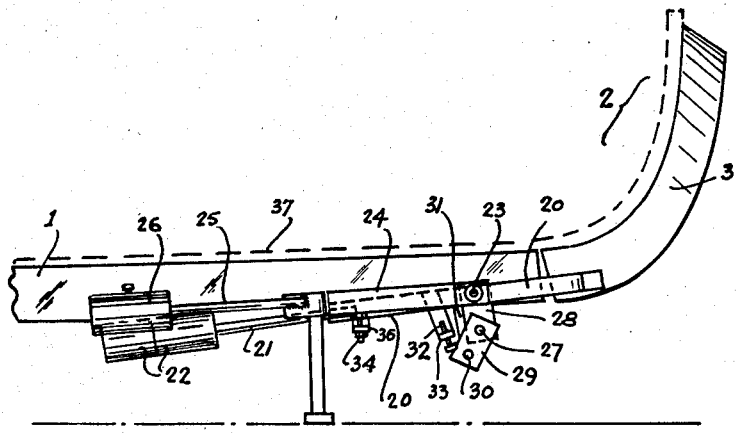
Figure 10 is a further side view similar to Figures 8 and 9 but showing the mould parts in the fully curved orientation.
Figure 8:
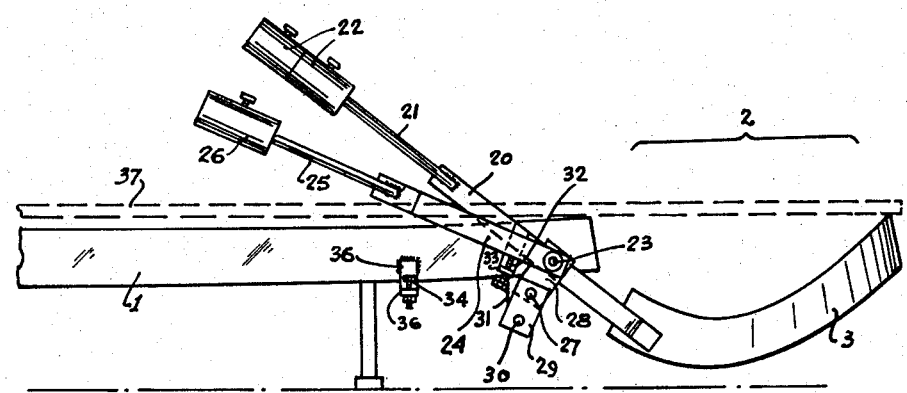
Figure 8 is a side view of Figure 7.
Figure 9:
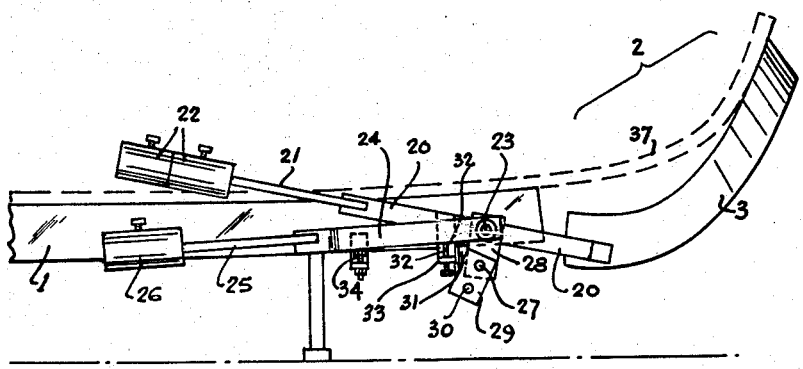
Figure 9 is a view similar to Figure 8 but showing the mould parts part way between the "flat" and curved orientations.

Conventional bracing members 19 are provided, as before; and Figures 8, 9 and 10 also show in broken lines a sheet of glass 37 in the various positions that it takes up during the bending operation.

The basic operation of this second form of the invention is the same as before, namely that the bending moment exerted on the end of the glass is reduced towards the end of the bending process. In the "flat" orientation shown in Figure 8, the weights 22 act directly through each of the main arms 20 to exert a turning moment on the end mould portion 2, while the weights 26 carried by the auxiliary arms 24 act through the stops 32 and brackets 33 to bear down on the main arms 20 and thus provide a further force tending to rotate the end mould portion 2 in an anti-clockwise direction. Once the parts have assumed the position shown in Figure 9, the auxiliary arms 24 will come to rest on their respective stops 34 so that there will no longer be a transmission of force from such arms to the stops 32. The weight of the weights 26 will then be carried wholly by the stops 34 and the turning moment acting on the end mould portion 2 will be reduced to that produced by the weights 22.

Finally, when the parts reach the fully curved orientation, the main arms 20 will come to bear on their stops 35 and the bending operation will be complete. This position is shown in Figure 10. The total bending moment exerted by the assembly of weighted arms will thus be stepped in a manner similar to that demonstrated by the curve Y in Figure 6.

In the embodiment of Figures 7 to 10, the main and auxiliary arms are mounted to rotate about different axes. This is not essential and these arms may be arranged all to rotate about a common axis if this is convenient having regard to the general mould design.

Figure 11:
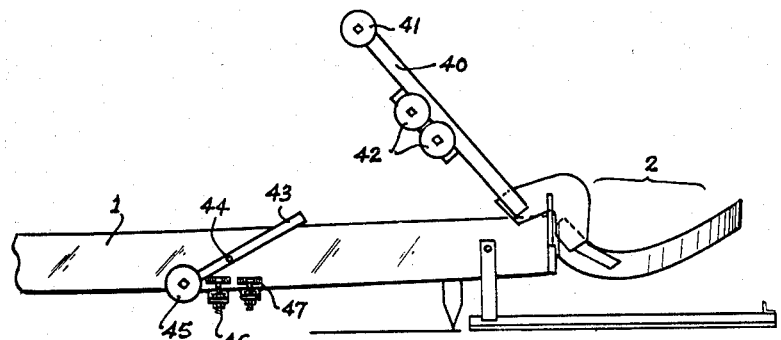
Figure 11 is a side view generally similar to Figures 2 and 8 but showing a third embodiment of the invention, the mould parts being in the "flat" orientation.
Figure 12:
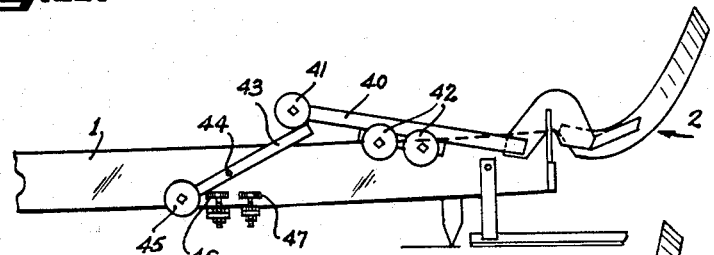
Figure 12 is a view similar to Figure 11 with the mould parts part way between the "flat" and curved orientations.
Figure 13:
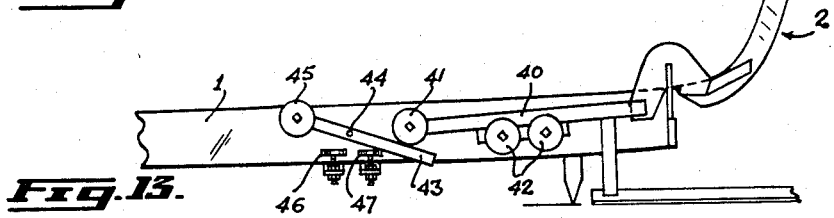
Figure 13 is a further similar view with the parts in the fully curved orientation.

Figures 11 to 13 illustrate a further manner in which the present invention may be embodied in a glass bending mould. These figures show a mould structurally substantially the same as the mould seen in Figures 1 to 5, except that the arms 40 which carry weights 41 and 42 for exerting a turning moment on the end mould portion 2 are simple rigid arms not provided with articulated auxiliary arms like the mould of Figures 1 to 5. In this embodiment of the invention, the reduced turning moment feature is obtained by means of pivotally mounted levers 43 that turn about pins 44 projecting outwardly from side bars 1. Only one set of these parts is shown, but, as in previous examples, they are duplicated on the remote side of the mould. Each of the levers 43 is arranged with one end in the path of travel of a part of an arm 40, conveniently the end weight 41. On its other end each lever 43 carries a weight 45 normally biasing such lever to the position shown in Figure 11. Anti-clockwise rotation beyond this point is prevented by an adjustable stop 46 mounted outwardly of the side bar 1. Clockwise rotation of each lever 43 is limited by an adjustable stop 47 also mounted on the neighbouring side bar 1.

Figure 12 shows the position of the parts just as the weights 41 come to bear on the unweighted ends of the levers 43. Further movement of the end mould portion 2 in an anti-clockwise direction will serve to rotate the levers 43 clockwise against the action of the weights 45. Accordingly, the net anti-clockwise turning moment acting on the end mould portion 2 will be reduced from this stage in the operation until the parts finally reach the fully curved orientation shown in Figure 13, this position being determined by the adjustment of the stop 47.

A modification of this latter method of reducing the turning moment towards the end of the glass bending operation, is embodied in the mould construction shown in Figures 14 to 18. These figures show a similar unarticulated arm 40 carrying weights 41 and 42. In this instance, in addition to the single lever 43, a second lever 49 is employed. The primary lever 43 is similarly mounted on pin 44 and carries weight 45. Its anti-clockwise movement is limited by stop 46 and its clockwise movement by stop 47. The secondary lever 49 is also mounted to rotate about the pin 44, although this is not an essential feature for attainment of the required operation; it merely represents a structural convenience. The secondary lever 49 is mounted between the primary lever 43 and the adjacent side bar 1 and carries on its free end a weight 50. An adjustable stop 51 is mounted with stop 46 on bracket 46' which projects from the side bar 1. The stop 51 limits anti-clockwise rotation of the lever 49 but does not project into the path of travel of the primary lever 43. A second adjustable stop 52 is mounted on the same bracket 48 with the stop 47 and is arranged in the path of the secondary lever 49, serving to limit clockwise rotation thereof.

The type of performance obtained with this double lever arrangement is illustrated in Figure 19 which is similar to Figure 6 in that the curve Z represents the turning moment exerted by the weight of the end mould portion itself; the point A represents the "flat" position of the mould; the point C represents the fully curved position of the mould; and the points B1 and B2 respectively represent the positions at which the weights 41 on the arms 40 engage the levers 43 and 49, i.e. the points of contact illustrated in Figures 15 and 16. The curve W replaces the former curve Y as representing the turning moment exerted by the weights on the end mould portion. The first step in this curve occurs at the point B1 when the weight 45 is raised from its stop 46 and the second step occurs at the point B2 when the weight 50 is raised from its stop 51. It will be observed that the point B2 is made very close to the point C in the embodiment illustrated, although there will be an infinite variety of choice in this respect to the designer. The double step in the curve has the advantage that the effective turning moment on the glass may be sharply reduced to almost zero just at the very end of the bending operation.

In the foregoing examples of the invention, the effective weight carried by the arm or arms situated on the side of the pivotal axis opposite that occupied by the end mould portion is modified in the latter stage of the bending operation. In accordance with a further embodiment of the invention, the modification of weight takes place on the same side of said pivotal axis as the end mould portion itself occupies. Instead of an effective weight reduction on the remote side of such axis, there is effectively a weight increase on the side of such axis on which the end mould portion is disposed. Such an alternative construction is illustrated in Figures 20 to 23.

These figures show a simple mould consisting, as before, of side bars 1 and a movable end portion 2 consisting of a bar 3. On each side of the mould there is provided an arm 52 which serves both pivotally to mount the end portion about plates 53 and also to support weights 54 which exert a turning moment on the end mould portion. It has been found convenient to employ a mould in which an internal thermal ballast member is used, for illustration of this aspect of the invention, because the ballast member can then readily be employed for the additional purpose of a weight. The thermal ballast device 55 is mounted within the inner periphery of the extreme end portion of the bar 3 of the end mould portion 2 (see particularly Figure 23) at a level slightly below the position of the glass 56 in the "flat" orientation of the mould (see Figure 20).

Conveniently, this thermal ballast device 55, which serves to influence the temperature characteristics of the operation, and in particular to maintain the tip of the glass somewhat colder than the remainder of the glass in the early stages of the operation, is held in position by means of a plurality of rods 57 extending from connections to a transverse rod 58 extending between the ends of the main side bars 1 of the end portion of the mould. In the past, however, ballast devices of this type have been fixedly mounted either on the stationary parts of the mould or on the end portion, usually the former. Then, when the end mould portion is elevated as the mould assumes its curved orientation, the ballast device has either moved at all times with the end portion or has remained stationary so as to be well beneath the glass and no longer have any thermal influence on the temperature thereof by the time the later part of the bending operation has been reached. In order to employ this ballast device as a weight in accordance with the present invention, the mounting of the ends of the rod 58 in the side bars 1 is made pivotal in nature, so that the ballast device 55 may rotate about an axis along such rod 58. A stop 59 is provided to limit clockwise rotation of this assembly and to maintain the device 55 correctly spaced from the glass 56 in the "flat" orientation of the mould.

The end mould portion 2 shown in Figures 20 to 23 is fitted with a U-shaped bar 60 pivoted to the bar 3 to extend downwardly and across from one side to the opposite side thereof to underlie the device 55. An adjustable stop 61 is placed near the centre of the bar 60 for co-operation with the undersurface of the device 55. In the "flat" orientation of the mould, the stop 61 lies well below the ballast device 55. After the parts have moved part way to the curved position (Figure 21) the stop 61 is brought to bear against the undersurface of the device 55. Continued movement of the end mould member 2 to the fully curved position shown in Figure 22 involves the lifting by such end member of the device 55 and its associated rods 57. This effectively modifies the total turning moment acting on the end mould portion in the manner shown in Figure 24 where the curve Y' is basically the same as the curve Y' seen in Figure 6. In this case at the point B which represents the point of engagement of stop 61 and device 55, the curve Z' is stepped up by reason of the extra weight added to the end member. As a result the effective final turning moment as represented by the distance between the curve Y' and Z' at the point C is reduced in the manner required.

We claim:

1. A concave glass bending mould comprising a first mould portion, a second mould portion mounted on said first mould portion to be pivotal between a "flat" orientation and a curved orientation, means tending to urge said second mould portion towards said curved orientation and a stop on said first mould portion for co-operation with said second mould portion for preventing further pivoting on attainment of said curved orientation, said means comprising a first weighted member acting on said second mould portion for urging it towards said curved orientation, a second weighted member acting on said second mould portion for urging it towards said curved orientation, and a support positioned to be engaged by and to sustain at least part of the weight of said second weighted member on attainment of a position by said second mould portion part way towards said curved orientation.

2. A concave glass bending mould comprising a first mould portion, a second mould portion mounted on said first mould portion to be pivotal between a "flat" orientation and a curved orientation, a weighted arm secured to said second mould portion for urging the same towards said curved orientation, a stop on said first mould portion for co-operating with said arm for preventing further pivoting on attainment of said curved orientation, a lever pivotally mounted on said first mould portion, a first end of said lever being positioned in the path of travel of a part of said arm, a weight urging said end of said lever towards said arm whereby to position said end to be engaged by said arm on attainment of a position by said second mould portion part way towards its curved orientation whereby to sustain a portion of the weight of said arm during the remainder of movement of said second mould portion.

3. A concave glass bending mould as claimed in claim 2, including a second lever pivotally mounted on said first mould portion and similarly positioned with a first end in the path of travel of a part of said weighted arm and a weight urging said end of said second lever towards said arm whereby to position said end to be engaged by said arm on attainment of a position by said second mould portion beyond the position of engagement between said arm and said first lever towards the curved orientation of the mould whereby to sustain a further portion of the weight of said arm during the final movement of said second mould portion to said curved orientation.

4. A concave glass bending mould comprising a first mould portion, a second mould portion mounted on said first mould portion to be pivotal between a "flat" orientation and a curved orientation, means tending to urge said second mould portion towards said curved orientation, and a stop on said first mould portion for co-operation with said second mould portion for preventing further pivoting on attainment of said curved orientation, a weight means positioned in the path of movement of said means tending to urge said second mould portion toward said curved orientation to be engaged by said second portion on attainment of a position part way towards said curved orientation, said weight means being so constructed and arranged as to oppose without overcoming said means tending to urge said second mould portion towards said curved orientation.

5. A concave glass bending mould comprising a first mould portion, a second mould portion mounted on said first mould portion to be pivotal between a "flat" orientation and a curved orientation, a weighted arm secured to said second mould portion for urging the same towards said curved orientation, a weight pivotally mounted on said first mould portion, means mounted on said second mould portion for engaging said weight on attainment of a position by said second mould portion part way towards said curved orientation, said weight being adapted to oppose without overcoming the effect of said weighted arm tending to urge said second mould portion towards said curved orientation.

6. A concave glass bending mould comprising a first mould portion, a second mould portion mounted on said first mould portion to be pivotable between a "flat" orientation and a curved orientation, means tending to urge said second mould portion towards said curved orientation, and a stop for preventing further pivoting on attainment of said curved orientation, said means comprising a first weighted member acting on said second mould portion for urging it towards said curved orientation, a second weighted member movably mounted on said first weighted member, and a support positioned to be engaged by and to sustain at least part of the weight of said second weighted member on attainment of a position by said second mould portion part way towards said curved orientation.

7. A concave glass bending mould comprising a first mould portion, a second mould portion mounted on said first mould portion to be pivotable between a "flat" orientation and a curved orientation, means tending to urge said second mould portion towards said curved orientation, and a stop for preventing further pivoting on attainment of said curved orientation, said means comprising a first arm secured to said second mould portion, a first weight secured to said arm, a second arm pivotally mounted on said first arm adjacent the free end thereof, a second weight secured to said second arm, and a support positioned to be engaged by and to sustain at least part of the weight of said second weight on attainment of a position by said second mould portion part way towards said curved orientation.

8. A concave glass bending mould comprising a first mould portion, a second mould portion mounted on said first mould portion to be pivotable between a "flat" orientation and a curved orientation, means tending to urge said second mould portion towards said curved orientation, and a stop on said first mould portion for co-operation with said second mould portion for preventing further pivoting on attainment of said curved orientation, said means comprising a first weighted member acting on said second mould portion for urging it towards said curved orientation, a second weighted member movably mounted on said first weighted member, means for limiting such movement between said first and second weighted members and for transmitting the weight of said second weighted member through said first weighted member to said second mould portion in the "flat" orientation thereof, and a support positioned to be engaged by and to sustain at least part of the weight of said second weighted member on attainment of a position by said second mould portion part way towards said curved orientation.

9. A concave glass bending mould comprising a first mould portion, a second mould portion mounted on said first mould portion to be pivotable between a "flat" orientation and a curved orientation, means tending to urge said second mould portion towards said curved orientation, and a stop on said first mould portion for co-operating with said second mould portion for preventing further pivoting on attainment of said curved orientation, said means comprising a first arm secured to said second mould portion, a first weight secured to said arm, a second arm pivotally mounted on said first arm adjacent the free end thereof, a second weight secured to said second arm, means for limiting pivotal movement between said first and second arms and for thereby transmitting the weight of said second weight to said second mould portion in the "flat" orientation thereof, and a support positioned to be engaged by and to sustain at least part of the weight of said second weight on attainment of a position by said second mould portion part way towards said curved orientation.

10. A concave glass bending mould comprising a main portion, a subsidiary portion pivotally mounted along one edge on said main portion to move between a "flat" orientation and a curved orientation, an arm secured to said subsidiary mould portion to project upwardly and away therefrom on the opposite side of the pivotal axis thereof, a first weight secured to said arm and effective to urge said subsidiary mould portion towards said curved orientation, a second weighted arm pivotally mounted on said first arm adjacent the free end thereof, means for limiting such pivotal movement between said arms and for thereby transmitting the weight of said second arm to said subsidiary mould portion, a support positioned to be engaged by said second arm on attainment of an intermediate orientation by said subsidiary mould portion part way towards said curved orientation, and a stop positioned to be engaged by said first arm whereby to prevent further pivotal movement of said second mould portion on attainment of said curved orientation, said support being arranged to support at least a part of the weight of said second arm during movement of said second mould portion between said intermediate orientation and said curved orientation.

11. A concave glass bending mould comprising a main portion, a subsidiary portion pivotally mounted along one end on said main portion to be movable between a "flat" orientation and a curved orientation, an arm secured to said subsidiary mould portion to project upwardly and away therefrom on the opposite side of the pivotal axis thereof, a first weight secured to said arm to urge said subsidiary mould portion towards said curved orientation, a second weighted arm pivotally mounted on said first arm adjacent the free end thereof, means limiting such pivotal movement between said arms to transmit the weight of said second arm through said first arm to said subsidiary mould portion and to position said second arm generally horizontally in the "flat" orientation, a shelf secured to said main mould portion and positioned to be engaged by and support at least part of the weight of said second arm after partial movement of said subsidiary mould portion towards said curved orientation, and a stop for co-operation with said first arm for limiting pivotal movement between said mould portions on final achievement of said curved orientation.

12. In a concave glass bending mould of the type comprising a first mould portion and a second mould portion mounted on said first mould portion to be pivotal between a "flat" orientation and a curved orientation, first means providing a relatively large net weight biasing said second mould portion towards said curved orientation, and second means operatively associated with said first means to suddenly reduce the net weight acting on said second mould portion on attainment of a position by said second mould portion part way towards said curved orientation.

References Cited in the file of this patent

UNITED STATES PATENTS

| | | |
|---|---|---|
| 760,959 | Connington | July 20, 1903 |
| 766,777 | Stimpson | Aug. 2, 1904 |
| 2,663,974 | Thompson | Dec. 29, 1953 |

FOREIGN PATENTS

| | | |
|---|---|---|
| 1,089,973 | France | Oct. 13, 1954 |

UNITED STATES PATENT OFFICE
CERTIFICATE OF CORRECTION
Patent No. 2,961,801            November 29, 1960

Arthur F. Donovan et al.

It is hereby certified that error appears in the above numbered patent requiring correction and that the said Letters Patent should read as corrected below.

Column 8, lines 35 and 36, for "being so constructed and arranged as" read -- providing means --.

Signed and sealed this 7th day of November 1961.

(SEAL)
Attest:

ERNEST W. SWIDER            DAVID L. LADD
Attesting Officer            Commissioner of Patents
                                                                                 USCOMM-DC